UNITED STATES PATENT OFFICE.

THOMAS M. FISHER, OF PORTLAND, MAINE.

IMPROVEMENT IN PRINTERS' ROLLERS.

Specification forming part of Letters Patent No. 212,367, dated February 18, 1879; application filed November 11, 1878.

*To all whom it may concern:*

Be it known that I, T. M. FISHER, of Portland, in the county of Cumberland and State of Maine, have invented certain new and useful Improvements in Printers' Rollers; and I do hereby declare that the following is a full, clear, and exact description of the invention, which will enable others skilled in the art to which it pertains to make and use the same.

My invention relates to a composition of ingredients to be applied to printers' rolls.

It consists of the following constituents, mixed together in the proportions stated, to wit: glue, one pound; glycerine, one-half pound; raw linseed-oil, one gill; vinegar, one pint. The glue is first moistened and dried and then boiled to a liquid form, the glycerine, oil, and vinegar being added, and the compound being stirred until the whole is thoroughly commingled. The glue is moistened, as above mentioned, in order to change it from its hard brittle condition, and it is then dried, as specified, until it is in a pasty, elastic, and tenacious condition, resembling in this particular the state of soft rubber.

What I claim as my invention, and desire to secure by Letters Patent, is—

The combination of glue, glycerine, vinegar, and linseed-oil, in the proportions named, as herein described, and for the purposes herein set forth.

T. M. FISHER.

Witnesses:
CHAS. H. KIMBALL,
F. M. SENNETTE.